US012688357B1

(12) United States Patent
Kumar et al.

(10) Patent No.: US 12,688,357 B1
(45) Date of Patent: Jul. 21, 2026

(54) UNIVERSAL NATURAL LANGUAGE REWRITING BASED ON INTENT

(71) Applicant: Grammarly, Inc., San Francisco, CA (US)

(72) Inventors: Dhruv Kumar, Vancouver (CA); Vipul Raheja, San Francisco, CA (US); Kunal Singhal, Coquitlam (CA); Nicholas Bern, San Francisco, CA (US)

(73) Assignee: Superhuman Platform Inc.

( * ) Notice: Subject to any disclaimer, the term of this patent is extended or adjusted under 35 U.S.C. 154(b) by 496 days.

(21) Appl. No.: 18/307,364

(22) Filed: Apr. 26, 2023

(51) Int. Cl.
    *G06F 40/253*     (2020.01)
    *G06F 40/106*     (2020.01)
    *G06F 40/40*     (2020.01)

(52) U.S. Cl.
    CPC .......... *G06F 40/253* (2020.01); *G06F 40/106* (2020.01); *G06F 40/40* (2020.01)

(58) Field of Classification Search
    CPC .................................................... G06F 40/253
    See application file for complete search history.

(56) References Cited

U.S. PATENT DOCUMENTS

| | | | | | |
|---|---|---|---|---|---|
| 11,475,223 | B2 * | 10/2022 | Chhaya | .................. | G06N 3/044 |
| 11,886,800 | B1 * | 1/2024 | Wang | .................... | G06F 40/284 |
| 2003/0144832 | A1 | 7/2003 | Harris | | |
| 2010/0285435 | A1 | 11/2010 | Keim et al. | | |
| 2019/0236132 | A1 | 8/2019 | Zhu et al. | | |

(Continued)

OTHER PUBLICATIONS

Sascha Rothe, Jonathan Mallinson, Eric Malmi, Sebastian Krause, Aliaksei Severyn "A Simple Recipe for Multilingual Grammatical Error Correction". Retrieved from arXiv:2106.03830v2 [cs.CL] Aug. 9, 2022 (Year: 2022).*

(Continued)

*Primary Examiner* — Richemond Dorvil
*Assistant Examiner* — Alexander G Marlow
(74) *Attorney, Agent, or Firm* — Van Hoven PC; Jordan Becker

(57) ABSTRACT

In one embodiment, a computer-implemented method comprises receiving, from a client device, a text sequence input that comprises a plurality of words; using a server computer, executing an inference stage of a trained unified machine learning model over the text sequence input, the unified machine learning model having been trained on a training dataset comprising a plurality of pairs of records, each of the pairs of records comprising an unmodified natural language text string and a modified natural language text string, each of the records being labeled using two or more prefixes, each prefix among the two or more prefixes corresponding to a different attribute of natural language that is represented in the modified natural language text string, the modified natural language text string comprising two or more modifications corresponding to the prefixes; using the unified machine learning model, outputting one or more text suggestions for the text sequence input and explanation data comprising one or more prefixes corresponding to the one or more text suggestions; transmitting, to the client device, instructions for presenting a user interface comprising the one or more text suggestions for the text sequence input and the explanation data.

22 Claims, 9 Drawing Sheets

(56) References Cited

U.S. PATENT DOCUMENTS

| | | | | |
|---|---|---|---|---|
| 2021/0217052 A1* | 7/2021 | Shah | ................ | G06Q 30/0244 |
| 2022/0222438 A1* | 7/2022 | Kwatra | ................ | G06N 3/045 |
| 2022/0405490 A1* | 12/2022 | Krause | ................ | G06F 40/253 |
| 2023/0137209 A1* | 5/2023 | Nangi | ................ | G06F 40/166 |
| | | | | 704/9 |
| 2023/0274100 A1* | 8/2023 | Garcia | ................ | G06F 40/166 |
| | | | | 715/229 |
| 2024/0061999 A1* | 2/2024 | Religa | ................ | G06F 40/253 |
| 2024/0304184 A1* | 9/2024 | Pieraccini | ............ | G10L 15/197 |

OTHER PUBLICATIONS

C. Raffel et al., "Exploring the Limits of Transfer Learning with a Unified Text-to-Text Transformer," Journal of Machine Learning Research 21 (2020), pp. 1-67.

M. Lewis et al. "BART: Denoising Sequence-to-Sequence Pre-training for Natural Language Generation, Translation, and Comprehension," arXiv:1910.13461v1 [cs.CL] Oct. 29, 2019, pp. 1-10.

* cited by examiner

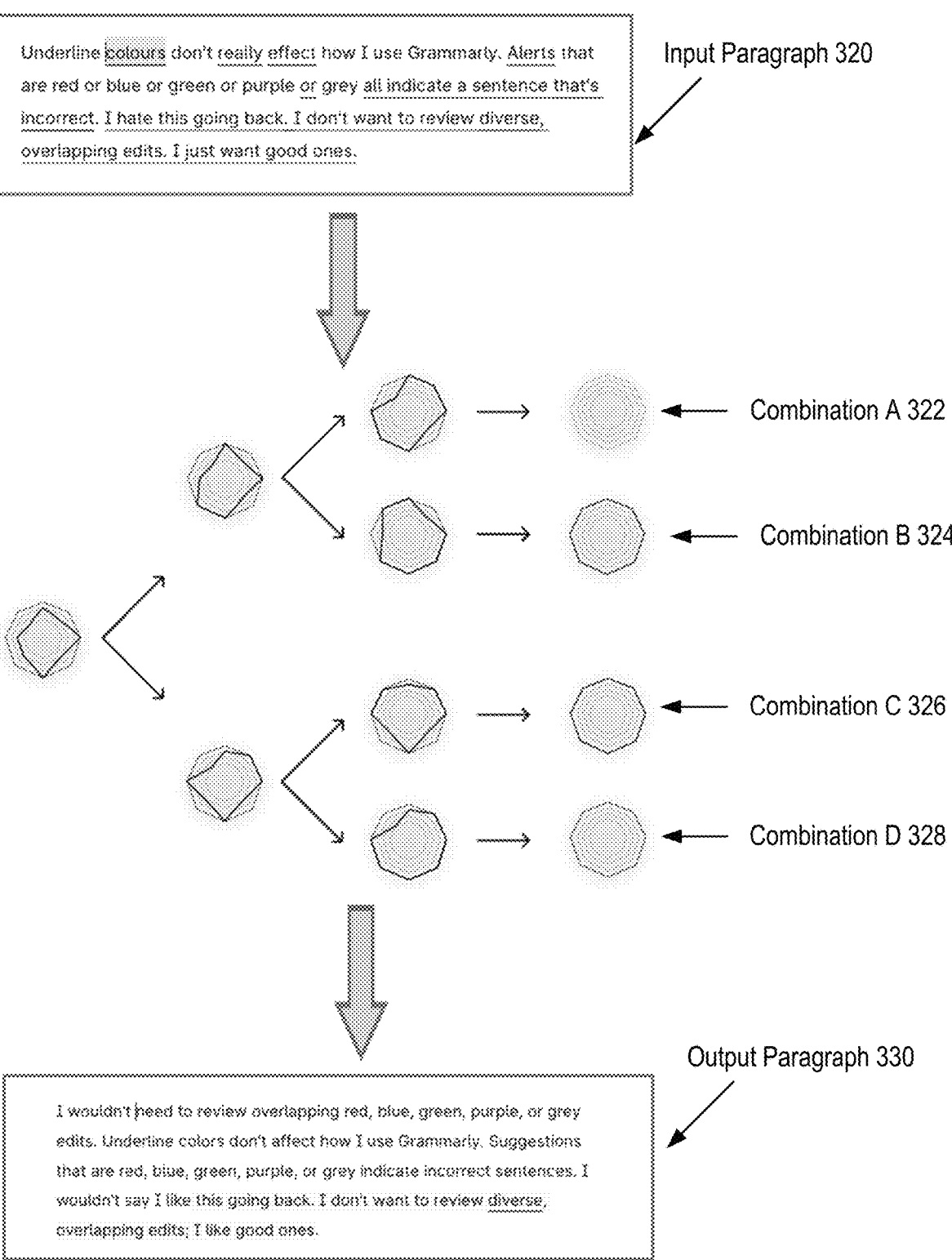

Input Paragraph 320

Underline colours don't really effect how I use Grammarly. Alerts that are red or blue or green or purple or grey all indicate a sentence that's incorrect. I hate this going back. I don't want to review diverse, overlapping edits. I just want good ones.

Combination A 322

Combination B 324

Combination C 326

Combination D 328

Output Paragraph 330

I wouldn't need to review overlapping red, blue, green, purple, or grey edits. Underline colors don't affect how I use Grammarly. Suggestions that are red, blue, green, purple, or grey indicate incorrect sentences. I wouldn't say I like this going back. I don't want to review diverse, overlapping edits; I like good ones.

Fig. 3C

UNIVERSAL NATURAL LANGUAGE REWRITING BASED ON INTENT

COPYRIGHT NOTICE

TECHNICAL FIELD

One technical field of the present disclosure is artificial intelligence and machine learning as applied to natural language processing. Another technical field is computer-implemented methods of correcting grammar, tone, and other attributes of digitally stored electronic documents that contain natural language text.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-implemented document checking, to detect issues such as incorrect spelling and improper grammar in natural language text, has entered widespread use. Commercially available spelling checkers and grammar checkers can use trained machine learning models to predict suggestions for changes to spelling and grammar. However, presently available methods, tools, and checkers typically use a single machine learning model to output suggestions for one dimension of checking, such as correctness. Performing checks of a text for multiple different dimensions of the text can require processing the text repeatedly using multiple different machine learning models. In particular, an application, server, unified system, or federated system could comprise a grammatical error correction (GEC) model, a clarity model, a tone model, and so forth. However, these systems typically provide no way for third-party developers to modify or customize the characteristics of the suggestions that users receive, based on the characteristics of the user or the task of the user. Furthermore, existing systems typically provide no solution to modify a text automatically based on multiple, complex, interrelated criteria, with goals such as detoxifying text or eliminating bias.

Further, the outputs of these checks usually are displayed without coordination using different colors or other means of visual emphasis. Consequently, the outputs are difficult to interpret and some of the dimensions may not apply to the user's then-current context of writing.

Based on the foregoing, the referenced technical fields have developed an acute need for better ways to develop a controllable, composable, and interpretable text processing system to rewrite a text sequence input based on suggestions organized in different linguistic dimensions. Writers, developers, and other users of computer-implemented text processing systems have developed a need for ways to generate combined suggestions and to customize the characteristics of the suggestions that users see, depending on where they are and what they are doing.

SUMMARY

The appended claims may serve as a summary of the invention.

BRIEF DESCRIPTION OF THE DRAWINGS

In the drawings:

FIG. 1C illustrates a web diagram showing one arrangement of the different dimensions of FIG. 1A.

FIG. 3A illustrates a plurality of web diagrams showing different weight values of selections of the dimensions of FIG. 1A, FIG. 1B, and FIG. 1C.

FIG. 3C illustrates an example of suggestions to improve a text input along multiple dimensions.

DETAILED DESCRIPTION

Figure 1A:
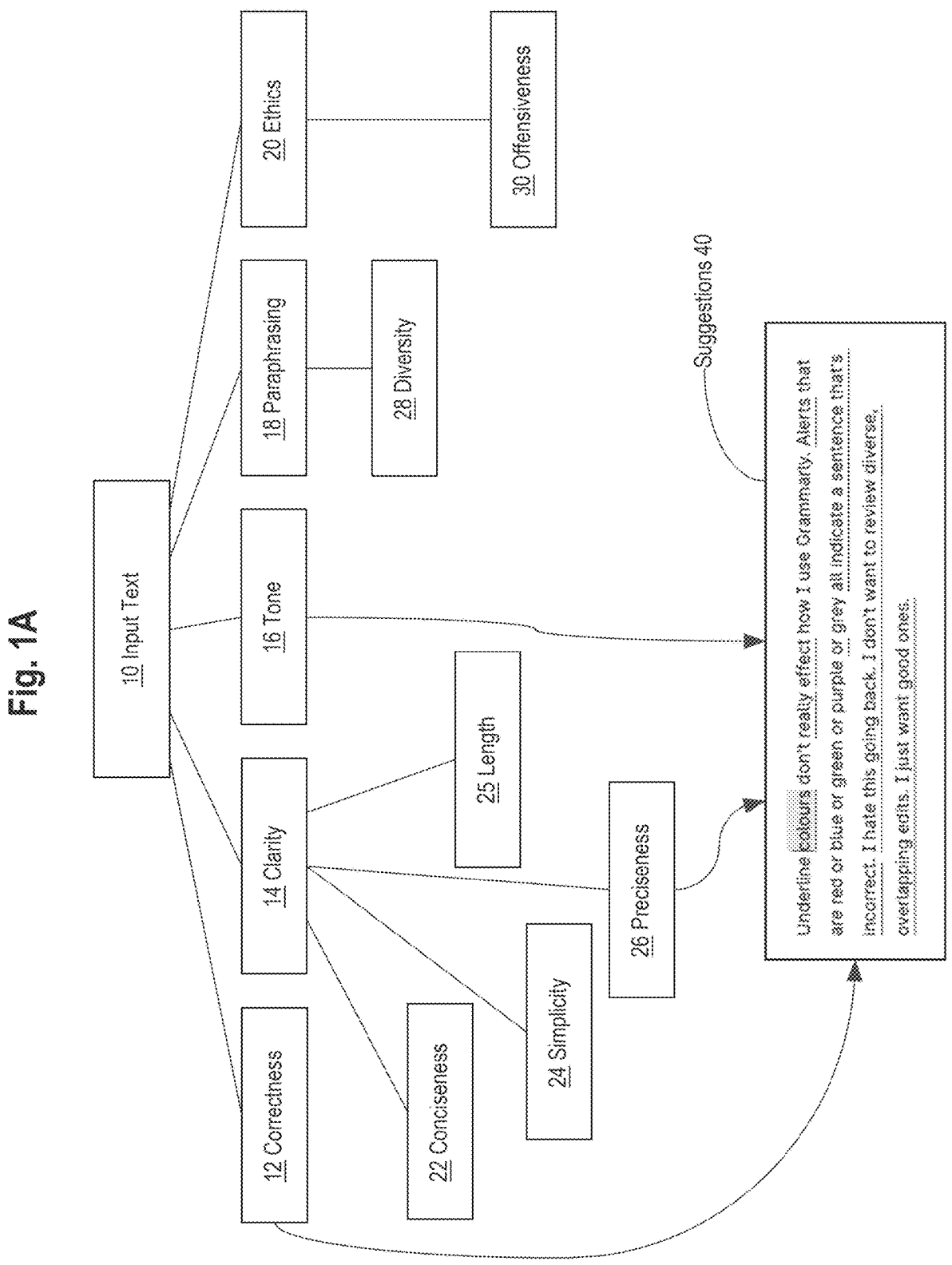
FIG. 1A illustrates an example hierarchy of multiple different dimensions for potentially modifying a source text and a text example with multiple different suggestions based on the dimensions.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments can be programmed to process and suggest modifications to a digitally stored electronic text based upon multiple different dimensions, intents, or labels. In one embodiment, a computer-implemented method comprises receiving, from a client device, a text sequence input that comprises a plurality of words. Using a server computer, the process executes an inference stage of a trained unified machine learning model over the text sequence input, the unified machine learning model having been trained on a training dataset comprising a plurality of pairs of records, each of the pairs of records comprising an unmodified natural language text string and a modified natural language text string, each of the records being labeled using one or more prefixes, each prefix among the one or more prefixes corresponding to a different attribute of natural language that is represented in the modified natural language text string, the modified natural language text string comprising two or more modifications corresponding to the prefixes. The unified machine learning model outputs one or more text suggestions for the text sequence input and explanation data comprising one or more prefixes corresponding to one or more text suggestions. The process then can transmit, to the client device, instructions for presenting a user interface comprising one or more text suggestions for the text sequence input and the explanation data. Suggestions can comprise revisions, rewrites, changes, substitutions of one or more words, or suggestions for any of the foregoing.

Using these techniques, computer-implemented natural language processing systems can suggest transformations, or actively transform, the digitally stored electronic text based on any of a plurality of dimensions to align the text with user intent. Examples of dimensions are further described herein and can include preciseness, conciseness, correctness, simplicity, length, tone, offensiveness, diversity, and the like. Embodiments can be trained to identify one or more dimensions from among the presence of the passive voice, run-on sentences, or overly wordy paragraphs, in one or more combinations with any of the foregoing dimensions. Each of these attributes can include one or more likewise clusters of more granular linguistic dimensions. For example, the outcome of the clarity dimension can be determined by combining a first outcome for a preciseness subdimension and a second outcome for a conciseness subdimension. As a result, the suggestion method can create suggestions that improve text along multiple, composable, tunable, and explainable attributes in a single pass.

Incorporating composable suggestion capabilities in-line with text sequence input processes allows a text processing system to automatically suggest and insert synonyms continuously while the user is typing, without requiring the user to look away from the area in which text is being typed. The disclosed technologies can create curated composable suggestions depending on the writer's context and preferences and display the composable suggestions everywhere the user writes. The text processing system can effectively understand the linguistic dimensionality of potential composable suggestions by leveraging high-quality annotated data at a scale necessary to deliver high-quality suggestions.

The text processing system can use a trained unified machine learning model to determine suggestions for modifying the text sequence input. As examples, the text processing system can use the unified machine learning model to 1) apply grammatical error correction (GEC) to the text to suggest modifications to grammar, 2) modify the text sequence input by merging or splitting one or more words in the text sequence input, 3) modify the text sequence input by expanding or compressing one or more words in the text sequence input, 4) modify the text sequence input by simplifying or complexifying one or more words in the text sequence input, 5) modify the text sequence input by paraphrasing one or more words in the text sequence input, 6)

modify the text sequence input by de-toxifying one or more words in the text sequence input, and 7) modify the text sequence input by using formal or informal terms or sentence structures for one or more words in the text sequence input. Other dimensions are possible using different training data.

Embodiments encompass the subject matter of the following numbered clauses:

1. A computer-implemented method, comprising: receiving, from a client device, a text sequence input that comprises a plurality of words; using a server computer, executing an inference stage of a trained unified machine learning model over the text sequence input, the unified machine learning model having been trained on a training dataset comprising a plurality of pairs of records, each of the pairs of records comprising an unmodified natural language text string and a modified natural language text string, each of the records being labeled using one or more prefixes, each prefix among the one or more prefixes corresponding to a different attribute of natural language that is represented in the modified natural language text string, the modified natural language text string comprising two or more modifications corresponding to the prefixes; using the unified machine learning model, outputting one or more text suggestions for the text sequence input and explanation data comprising one or more prefixes corresponding to the one or more text suggestions; transmitting, to the client device, instructions for presenting a user interface comprising the one or more text suggestions for the text sequence input and the explanation data.

2. The method of clause 1, wherein the unified machine learning model comprises a multi-class neural network.

3. The method of clause 1, further comprising, via executing the inference stage of the unified machine learning model over the text sequence input, outputting a plurality of unified suggestions to modify the text sequence input in a plurality of different attributes.

4. The method of clause 1, wherein the plurality of attributes comprises two or more of correctness, clarity, length, simplification, diversity, sensitivity, and tone.

5. The method of clause 1, the unified machine learning model having been trained to output the one or more text suggestions for all of: a grammatic error correction (GEC) to correct a grammatic error in the text sequence input; modifying the text sequence input by merging or splitting one or more words in the text sequence input; modifying the text sequence input by expanding or compressing one or more words in the text sequence input; modifying the text sequence input by simplifying or complexifying one or more words in the text sequence input; modifying the text sequence input by paraphrasing one or more words in the text sequence input; modifying the text sequence input by de-toxifying one or more words in the text sequence input; and modifying the text sequence input by using formal or informal terms for one or more words in the text sequence input.

6. The method of clause 1, further comprising: determining a first suggestion plot for the plurality of attributes before applying the text suggestions for the plurality of words of the text sequence input; determining a second suggestion plot for the plurality of attributes after applying the text suggestions for the plurality of words of the text sequence input; determining a suggestion improvement by comparing the first suggestion plot to the second suggestion plot; in response to determining the suggestion improvement is above a predetermined threshold, accepting the text suggestions for the plurality of words of the text sequence input.

7. The method of clause 6, further comprising, in response to determining that the suggestion improvement is below the predetermined threshold, rejecting the text suggestions for the plurality of words of the text sequence input.

8. The method of clause 1, further comprising: before executing the inference stage: receiving first dimension input specifying one or more of the attributes of natural language to check; receiving second dimension input specifying one or more of the attributes of natural language not to check; determining two or more input prefixes corresponding to the first dimension input and the second dimension input; programmatically transmitting the two or more input prefixes to the trained unified machine learning model to limit the outputting of the one or more text suggestions for the text sequence input and explanation data to the attributes of natural language corresponding to the first dimension input and the second dimension input.

9. The method of clause 8, further comprising receiving the first dimension input and the second dimension input from a user computer associated with an end user or an administrator.

10. The method of clause 8, further comprising determining the first dimension input and the second dimension input by reading configuration data.

2. Structural & Functional Overview

FIG. 1A illustrates an example hierarchy of multiple different dimensions for potentially modifying an input text and a text example with multiple different suggestions based on the dimensions. An input text 10 can be obtained programmatically from an application, text entry window, or widget of a web page, or within a native or external text editor. For example, the input text can comprise a natural language text sequence of a plurality of words. The input text 10 can be characterized by a plurality of different attributes or dimensions, including but not limited to correctness 12, clarity 14, tone 16, paraphrasing 18, and ethics 20. Each of the attributes or dimensions can include one or more subdimensions. For example, the clarity 14 dimension can include conciseness 22, simplicity 24, length 25, and preciseness 26. The paraphrasing dimension 18 can include diversity 28. The dimension of ethics 20 can include offensiveness 30. In an embodiment, a single unified machine learning model can be trained using one or more training datasets in which source text elements and modified text elements are paired and labeled with prefixes specifying one or more of the dimensions of FIG. 1A, depending upon the semantic content of the source text elements and modified text elements. A text processing system then executes an inference stage of the unified machine learning model over the input text 10 to determine a unified set of suggestions 40 for modifications to the input text, the suggestions reflecting all of the dimensions, or one or more of the dimensions.

The text processing system can organize suggestions 40 into different linguistic dimensions, such as correctness 12, clarity 14, tone 16, paraphrasing 18, and ethics 20, etc. In particular, the text processing system can determine suggestions 40 associated with the dimension of clarity 14 by combining conciseness 22, simplicity 24, length 25, and preciseness 26 into a single outcome. In an embodiment, the user can use the text processing system to apply these suggestions 40 sequentially. For example, the user can first accept a first suggestion that changes the text input 10 grammar, then accept a second suggestion that makes the text input 10 clear, and accept a third suggestion that applies a correct tone for the text input 10. In some embodiments, the input can specify applying all suggestions concurrently or automatically without user review.

2.1 Distributed Computer System Example

Figure 1B:
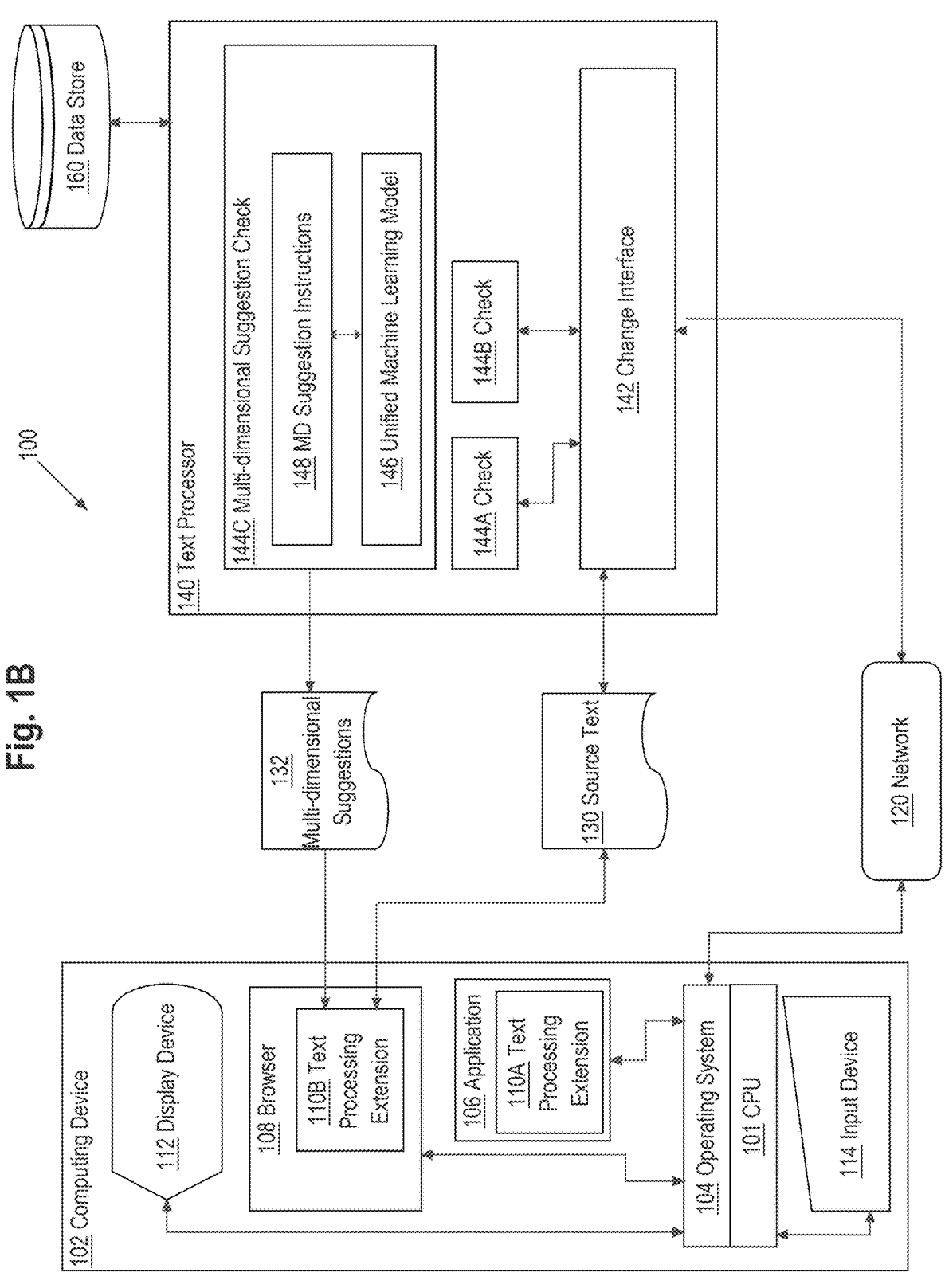
FIG. 1B illustrates a distributed computer system showing the context of use and principal functional elements with which one embodiment could be implemented.

FIG. 1B illustrates a distributed computer system 100 showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1B illustrates only one of many possible arrangements of components configured to execute the programming described herein. Other arrangements may include fewer or different components, and the division of work between the components may vary depending on the arrangement.

FIG. 1B, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of determining a composable suggestion for a text input based on suggestions organized into different linguistic dimensions. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1B, computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1B, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1B shows the operating system 104 coupled to an application 106 and a browser 108, but other embodiments may have more or fewer apps or applications hosted on a computing device 102. Logical connection may refer to a flow of digital information or data communication that is established between two devices on a network 120 by network software communicating with, for example, the computing devices' operating systems either directly or by a virtual machine. Examples of protocols that may be used to establish a logical connection include hypertext transfer protocol (HTTP) and secure sockets layer (SSL).

At runtime, one or more of application 106 and browser 108 loads, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or obtaining input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 1A and other sections herein.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text, or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch-to-text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or inter-networks in any combination, using any of terrestrial or satellite, wired, or wireless network links. Network 120 may be implemented on any medium or mechanism that provides for the exchange of data, signals, and/or instructions between components 102, 130, 132, 140, 160 of system 100. Examples of network 120 include, without limitation, a Local Area Network (LAN), a Wide Area Network (WAN), an Ethernet network or the Internet, or at least one terrestrial, satellite, or wireless link, or a combination of any number of different networks and/or communication links.

In an embodiment, the text processor 140 comprises one or more server computers, workstations, computing clusters, and/or virtual machine processor instances, with or without network-attached storage or directly attached storage, located in any of enterprise premises, private data center, public data center, and/or cloud computing center. Text processor 140 broadly represents a programmed server computer having processing throughput and storage capac-ity sufficient to communicate concurrently with thousands to millions of computing devices 102 associated with different users or accounts. For purposes of illustrating a clear example and focusing on innovations that are relevant to the appended claims, FIG. 1B omits basic hardware elements of text processor 140 such as a CPU, bus, I/O devices, main memory, and the like, illustrating instead an example soft-ware architecture for functional elements that execute on the hardware elements. Text processor 140 also may include foundational software elements not shown in FIG. 1B, such as an operating system consisting of a kernel and primitive services, system services, a networking stack, an HTTP server, other presentation software, and other application software. Thus, text processor 140 may execute on a first computer, and text processing extensions 110A, 110B may execute on a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1B represents one or more documents that computing device 102 is viewing or reading via extensions 110A, 110B, and/or text changes that text processing extension 110B transmits to change interface 142. In particular, the text processor 140 can receive, from a client device, such as the computing device 102, a text sequence input that comprises a plurality of words from the source text 130. For example, source text 130 can include tons of emails and/or messages to improve text along multiple, composable, tunable, and explainable attributes in a single pass. The text processor 140 can change the sequence of words in a sentence or a paragraph for each of the emails and messages using other relevant words or adding additional context. As another example, the text processor 140 can determine full-sentence suggestions to improve the clarity of the source text 130 using a unified machine learning model 146 which is a sequence-to-se-quence text generation model to generate unified sugges-tions calibrated to improve/modify the text to different degrees along separate attributes, such as correctness, length, simplicity, toxicity, etc. In an embodiment, change interface 142 is programmed to distribute each and every sentence or paragraph of a document that is being read and/or text change arriving from a text processing extension 110A, 110B to all of the checks 144A, 144B, 144C, which execute in parallel and/or in independent threads. In various embodiments, the source text 130 can be obtained from an e-mail application like GMAIL, an instant messaging appli-cation like SLACK, a web page that the browser 108 has accessed and rendered, or other applications.

Thus, in one embodiment, the text processor 140 may be programmed to programmatically receive a digital elec-tronic object comprising a text input from source text 130, such as an email with the source text 130, a message with the source text 130, an application protocol message with the source text 130, an HTTP POST request with the source text 130 as a payload, or using other programmed mechanics. In various embodiments, the first computer executes a text processor that is communicatively coupled to a text proces-sor extension that is executed at the second computer and programmatically receives the digital electronic object com-prising the text input via a message initiated at the text processor extension and transmitted to the text processor; and/or the text processor extension executes in association with an application program that is executing at the second computer, the text processor extension being programmed to automatically detect a change in a text entry window of the application program and, in response, to initiate the mes-sage; and/or the text processor executes in association with a browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a multi-dimensional suggestion check, and therefore it is also denoted "multi-dimensional suggestion check 144C" in this description.

In an embodiment, the multi-dimensional suggestion check 144C comprises multi-dimensional suggestion instructions 148, which interoperate with a data store 160. The data store 160 can be implemented partially in main memory, using technologies such as Redis, and in long-term storage technologies in non-volatile storage devices such as cloud-based disk storage. The data store 160 can be inte-grated with text processor 140 or implemented as separate storage. In an embodiment, data store 160 comprises a database, flat file system, object store, or another digital data repository. The data store 160 can be configured using a table schema or other data storage schema to store a large number of records, each record comprising at least one or more hash values of text units, in association with user identifiers. The structure and use of such records is described further in other sections herein.

The multi-dimensional suggestion instructions 148 are embodied as computer programming code stored in computer memory that when executed causes a computer system 100 to operate a text processor 140. In an embodiment, the multi-dimensional suggestion instructions 148 can execute the inference stage of a trained unified machine learning model 146 to generate unified suggestions calibrated to improve/modify the text in different dimensions corresponding to attributes, such as GEC, length, simplicity, toxicity, clarity, paraphrasing, tone, offensiveness, diversity, and others. The unified machine learning model 146 can comprise a multi-class neural network. In particular, the multi-dimensional suggestion instructions 148 can use a server computer to execute an inference stage of a trained unified machine learning model 146 over the text sequence input in the source text 130.

The unified machine learning model 146 can be trained on a training dataset comprising a plurality of pairs of records. Each of the pairs of records comprises an unmodified natural language text string and a modified natural language text string. Each of the records is labeled using one or more prefixes, each prefix among the one or more prefixes corresponding to a different attribute of natural language that is represented in the modified natural language text string. The modified natural language text string comprises one or more modifications corresponding to the prefixes. The plurality of attributes comprises one or more of correctness, clarity, length, simplification, diversity, sensitivity, and tone.

In an embodiment, the multi-dimensional suggestion instructions 148 can execute the inference stage of the unified machine learning model 146 over the text sequence input causing outputting unified suggestions to modify the text sequence input in a plurality of different attributes. For example, the unified machine learning model 146 can learn to interpret individual edit intentions, such as GEC, simplification, or formality. As another example, the unified machine learning model 146 can learn to combine multiple intents and make corresponding edits, such as GEC+Formality and so on. Likewise, the multi-dimensional suggestion instructions 148 allow a user to customize the characteristics of suggestions the user see depending on where they are and what they are doing. In particular, the multi-dimensional suggestion instructions 148 can allow the user to make different kinds of suggestions, such as GEC, clarity, tone, or simplification, with a single underlying machine-learning model. Thus, the multi-dimensional suggestion instructions 148 can customize the kind of suggestions which is aligned with the user's true intents.

In an embodiment, the multi-dimensional suggestion instructions 148 can apply the unified machine learning model 146 to determine one or more text suggestions for the text sequence input and explanation data comprising one or more prefixes corresponding to one or more text suggestions. In particular, one or more text suggestions can comprise all of 1) a grammatic error correction (GEC) to correct a grammatic error in the text sequence input, 2) modifying the text sequence input by merging or splitting one or more words in the text sequence input, 3) modifying the text sequence input by expanding or compressing one or more words in the text sequence input, 4) modifying the text sequence input by simplifying or complexifying one or more words in the text sequence input, 5) modifying the text sequence input by paraphrasing one or more words in the text sequence input, 6) modifying the text sequence input by de-toxifying one or more words in the text sequence input, and 7) modifying the text sequence input by using formal or informal terms for one or more words in the text sequence input.

In an embodiment, the multi-dimensional suggestion instructions 148 can be programmed to determine composable suggestions for a plurality of applications: 1) suggestions tuned to user-defined dimensions, 2) suggestions tuned to user-learned dimensions, 3) suggestions tuned to external vendor-defined dimensions, and 4) suggestions tuned to external vendor-learned dimensions. For example, user input or observation of user computing signals can specify the intent to write in a style that is skewed toward some dimensions while not focusing on others. The intent can be determined to write clearly, succinctly, and correctly, but not to over-correct language diversity, offensiveness, or tone. Based on the intent, the multi-dimensional suggestion instructions 148 can determine one or more dimensions, such as correctness, clarity, and simplicity, for identifying suggestions that align with the intent.

As another example, text processor 140 can be programmed to learn which types of suggestions a user accepts and, over time, modify the suggestions it sends to match that user's implicit writing preferences for user-learned dimensions. In an embodiment, change interface 142 is programmed to receive input from the input device 114 via the text processing extension 110B specifying whether the computing device 102 accepted a suggestion, dismissed a suggestion, ignored a suggestion, or implicitly dismissed the suggestion by submitting new source text 130 in which a previous suggestion has been addressed. Thus, text processor 140 can be programmed to receive a large amount of signal data from computing device 102 as text processing occurs. Because each of the multi-dimensional suggestions 132 is labeled with one or more dimensions, the text processor 140 can store, in data store 160, statistical data representing numbers or percentages of suggestions of different dimensions that are accepted, dismissed, ignored, or implicitly dismissed. For example, the stored data could indicate that the computing device 102, or an account associated with a user of the device, accepted 90% of suggestions labeled as correctness 12, 75% of suggestions labeled as clarity 14, 50% of suggestions for paraphrasing 18, 10% of suggestions labeled as ethical AI 20, and 25% of suggestions labeled as tone 16. Percentages, raw values, or metrics derived from them can be transformed into weight values for each of the dimensions, and the weight values can be stored in data store 160 in association with user account data. Thereafter, as the multi-dimensional suggestion check 144C produces modified suggestions, the multi-dimensional suggestion instructions 148 can suppress or amplify the suggestions based on the weight values of dimensions corresponding to the suggestions. In this way, suggestions can align with the user-learned dimensions associated with the modified suggestions.

As another example, an enterprise associated with computing device 102 can specify preferred dimensions, or even weight values, to be stored in data store 160 and used to weigh, suppress, or amplify suggestions, in the manner described above, for all users or accounts associated with the enterprise. Based on the specified dimensions or weights, the multi-dimensional suggestion instructions 148 can be programmed to identify, suppress, or amplify suggestions that align with the enterprise-specific dimensions.

In an embodiment, the multi-dimensional suggestion instructions 148 can send, to the client device, such as the computing device 120, instructions for presenting a user interface comprising one or more text suggestions for the text sequence input and the explanation data. The presentation instructions can comprise draw commands, display commands, HTML code, or calls to a presentation interface of an operating system, and can be configured to display suggestions 40 with underlining, highlighting, colored text, or other visual attributes to specify a suggestion.

Figure 1C:
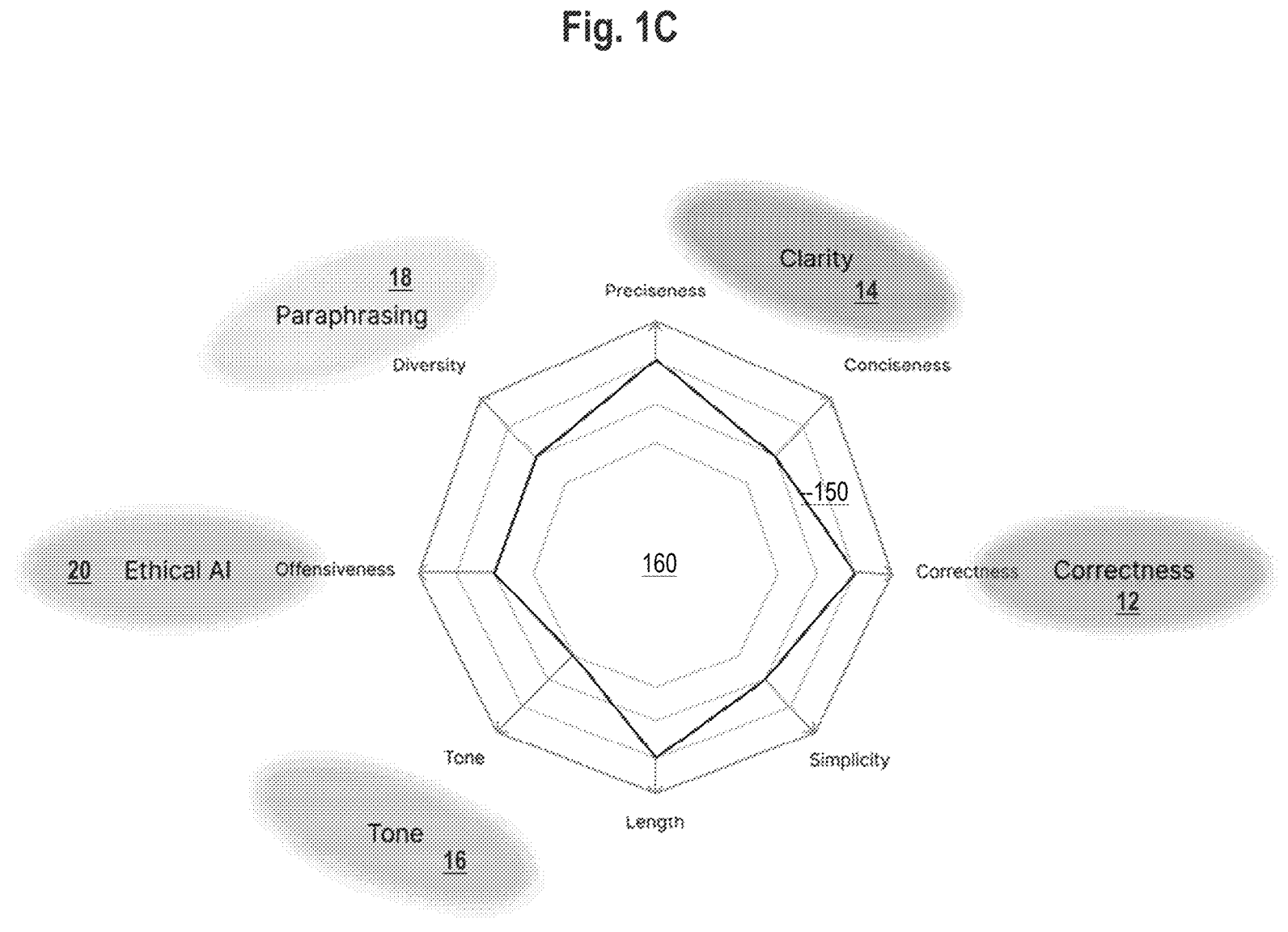

FIG. 1C is a web diagram showing one arrangement of the different dimensions of FIG. 1A. FIG. 1C comprises one example visual representation of weight values of different dimensions of text processing. The text processor 140 can be programmed to evaluate weight values for dimensions such as correctness 12, clarity 14, paraphrasing 18, ethical AI 20, and tone 16, which are represented using ovals around a perimeter of a web diagram 160. Each of the dimensions can include one or more subdimensions. For example, the dimension of clarity 14 can include conciseness 22, simplicity 24, length 25, and preciseness 26. The paraphrasing dimension 18 can include diversity 28. The dimension of ethics 20 can include offensiveness 30.

Each dimension or subdimension can be associated with a weight value. For purposes of illustrating a clear example, FIG. 1C presumes that weight values are integers between "0" and "3", and for this reason, the web diagram comprises four concentric octagons and each represents a different magnitude of a weight value. The innermost octagon represents a weight value of "0" and the outermost octagon represents "3". However, in other embodiments, other ranges of weight values can be used. Furthermore, in the example of FIG. 1C, dimensions and subdimensions have the following weight values:

TABLE 1

EXAMPLE WEIGHT VALUES

| |
|---|
| Preciseness = 3 |
| Conciseness = 1 |
| Correctness = 3 |
| Simplicity = 1 |
| Length = 3 |
| Tone = 0 |
| Offensiveness = 1 |
| Diversity = 1 |

Weight values of dimensions can be received or obtained from any of the sources described above: express input in a user interface or programmatic interface; learning from user action; enterprise-specific configuration data.

Additionally or alternatively, the text processor 140 can be programmed to calculate a parameter value for each dimension or subdimension to assess the need to generate separate suggestions for each dimension or subdimension. A value of the respective parameter for the corresponding dimension or subdimension is indicative of the improvement that is needed to improve the text input along the corresponding dimension or subdimension. For example, a value of "3" for each of correctness, preciseness, and length can suggest the text processor 140 determines that the text input has a good quality of correctness, preciseness, and length. As another example, a value of "0" for tone can suggest that the text processor 140 determines that the text input has a bad quality for tone for improvement.

In an embodiment, the text processor 140 can determine a first suggestion plot for a plurality of attributes before applying the text suggestions for the plurality of words of the text sequence input. Likewise, the text processor 140 can determine a second suggestion plot for the plurality of attributes after applying the text suggestions for the plurality of words of the text sequence input. Therefore, the text processor 140 can determine a suggestion improvement by comparing the first suggestion plot to the second suggestion plot. In response to determining the suggestion improvement is above a predetermined threshold, the text processor 140 can accept the text suggestions for the plurality of words of the text sequence input. In response to determining the suggestion improvement is below the predetermined threshold, the text processor 140 can reject the text suggestions for the plurality of words of the text sequence input.

2.2 Example Data Processing Flows

Figure 2A:
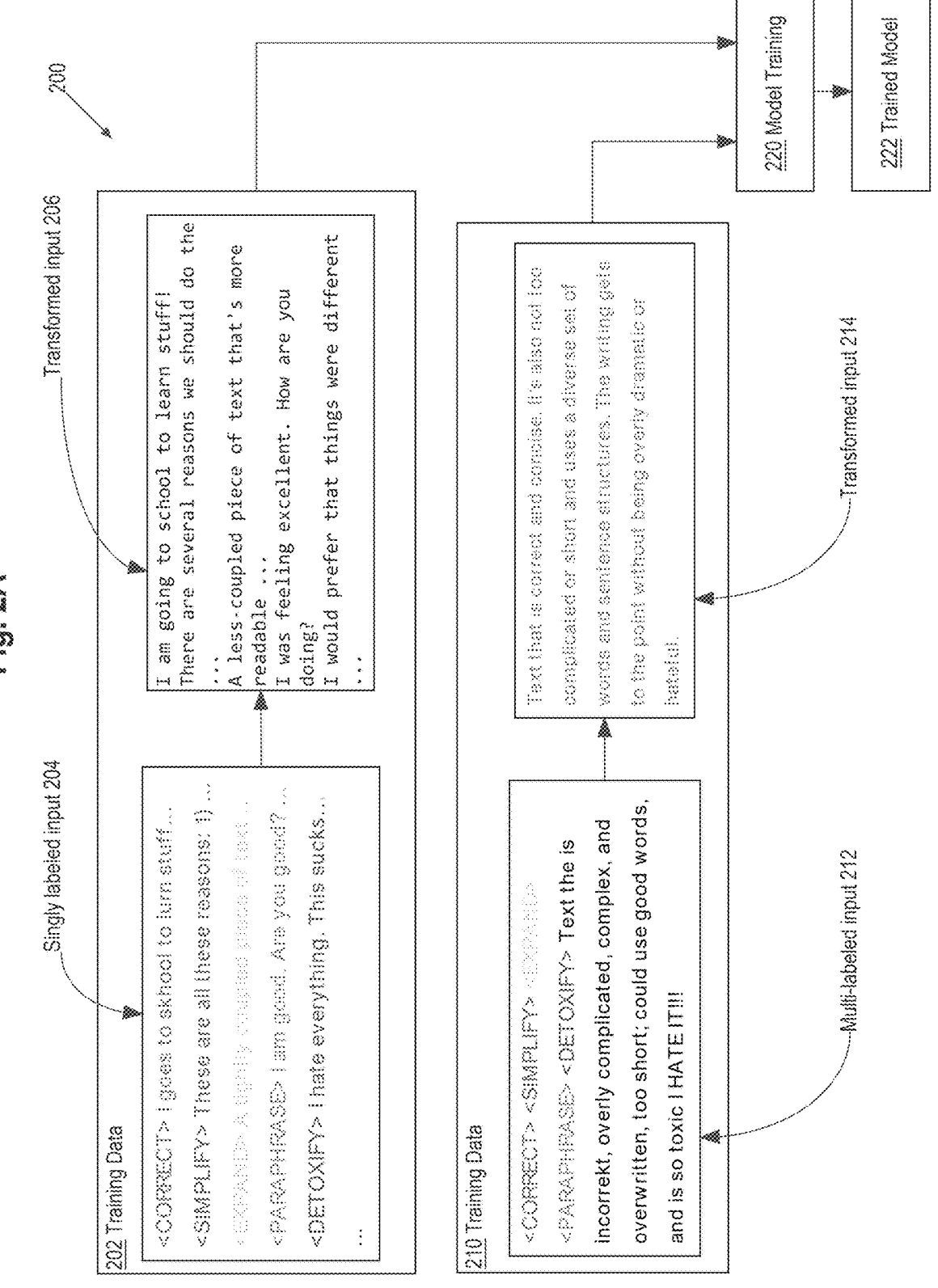
FIG. 2A illustrates an example data flow of singly labeled input and multi-labeled input that can be used to produce training data for a trained machine learning model.

FIG. 2A illustrates an example data flow of singly labeled input and multi-labeled input that can be used to produce training data for a trained unified machine learning model. FIG. 2A is a simplified flow diagram of one embodiment of operations that can be performed by at least one device of a computing system. The operations of a data flow 200 as shown in FIG. 2A can be implemented using executable instructions that are stored in computer memory and executed using computer system 100, but other embodiments may use other systems, devices, or implemented techniques. One or more operations in FIG. 2A may be performed by one or more components as described in FIG. 1A and FIG. 1B; for example, the text processor 140 can be programmed, using one or more sequences of instructions, to execute an implementation of FIG. 2A or a different computer, processor, or virtual compute instance could be used. While the various operations in FIG. 2A are presented and described sequentially, one of ordinary skill in the art will appreciate that some or all the operations may be executed in different orders, may be combined or omitted, and some or all the operations may be executed in parallel. Furthermore, the operations may be performed actively or passively. Data elements shown in FIG. 2A can be stored in data store 160.

FIG. 2A and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

In an embodiment, flow 200 comprises receiving a first set of training data 202, which comprises pairs of training data elements consisting of singly labeled input 204 and transformed input 206. Receiving training data can comprise reading digitally stored files in data store 160, or responding to an API call that identifies a networked source of a training dataset. In an embodiment, each training data element of a pair can comprise text, sets of tokens produced by applying a tokenization processor to an input text, or a combination of either text or sets of tokens with prefix values and other metadata. Each training data element of singly labeled input 204 is labeled using a single prefix value such as one of <CORRECT>, <SIMPLIFY>, <EXPAND>, <PARA-PHRASE>, <DETOXIFY>, as shown in FIG. 2A, although other examples can use other prefix values. Thus, in singly labeled input 204, each text line comprises a single prefix value and a corresponding text element, and different prefixes correspond to different text elements. Prefixes can identify attributes using other terms and can refer to any of correctness, clarity, length, simplification, diversity, sensitivity/toxicity, and tone, for GEC, text simplification, sentence compression, sentence merging, paraphrasing, and detoxification.

In an embodiment, a second set of training data 210 comprises multi-labeled input 212 paired with transformed input 214. The multi-labeled input 212 comprises a first text element that is labeled concurrently using two or more prefixes, such as a concatenated set consisting of <CORRECT><SIMPLIFY><EXPAND> <PARAPHRASE><DETOXIFY>, as shown in FIG. 2A. Such a concatenated set of prefixes specifies that the first text element is incorrect, or associated with issues relating to, all of correctness, simplification, conciseness, paraphrasing, and sensitivity/toxicity. Similarly, the paired transformed input 214 is free of the same issues.

Different items of multi-labeled input 212 can have from two to N prefixes, where N has no specific limit but in one embodiment N<10, and the example of FIG. 2A showing five prefixes is not required in all embodiments, or in all multi-labeled input 212 of an embodiment. That is, the multi-labeled input 212 could have some text elements with five prefixes, other text elements with three prefixes, and other text elements with two, four, six, or more prefixes. What is important is that a particular text element has more than two prefixes and is paired with a transformed input 214 that is free of all issues specified in the prefixes of the multi-labeled input. In an embodiment, the computer system 100 can use a parallel corpus for all intent combinations of intents based on two, three, or more attributes.

In an embodiment, a set of programmatic instructions execute model training 220 based, in part, on receiving training data 202 and training data 210 as inputs. Model training 220 comprises training the unified machine learning model 146 using the singly labeled input 204, the transformed input 206, the multi-labeled input 212, and the transformed input 214. In particular, the computer system 100 can train a single sequence-to-sequence model to combine multiple dimensional prefixes in a single pass.

The prefixes can be labels that are applied manually or created by joining existing one-dimensional training data-sets corresponding to different attributes and concatenating the labels. For example, the computer system 100 can use the unified machine learning model 146 to determine composable suggestions which can mix and match different combinations of prefix tokens. Each of the prefix tokens is associated with a particular linguistic dimension: 1) a "correct" prefix token is associated with the correctness dimension; 2) a "simplify" prefix token is associated with the simplification dimension; 3) a "expand" prefix token is associated with the dimension of length; 4) a "paraphrase" prefix token is associated with the diversity dimension; and 5) a "detoxify" prefix token is associated with the sensitivity dimension. As a result, a single model can be fine-tuned to trade off corresponding linguistic dimensions differently to produce unique suggestions in different situations. For example, the unified machine learning model 146 can be a sequence-to-sequence transformer-based language model. As another example, the unified machine learning model 146 can be trained to update on the order of ~700M parameters by using multiple input/output pairs (parallel corpus) representing different combinations of linguistic dimensions.

Trained model 222 and unified machine learning model 146 are equivalent. After the trained model 222 is formed via the data flow of FIG. 2A, the trained model can be evaluated in an inference stage over source text 130 (FIG. 1B) as part of the multi-dimensional suggestion check 144C to output the multi-dimensional suggestions 132. For example, the computer system 100 can apply the trained unified machine learning model 146 to determine one or more composable suggestions by modifying the input text sequence received from the software application, such as browser 108 or another software application running on computing device 102 or another device. In particular, the computer system 100 can use the trained unified machine learning model 146 to make different kinds of suggestions, such as GEC, clarity, tone, simplification, etc., which are aligned with a user's intent.

Figure 2B:
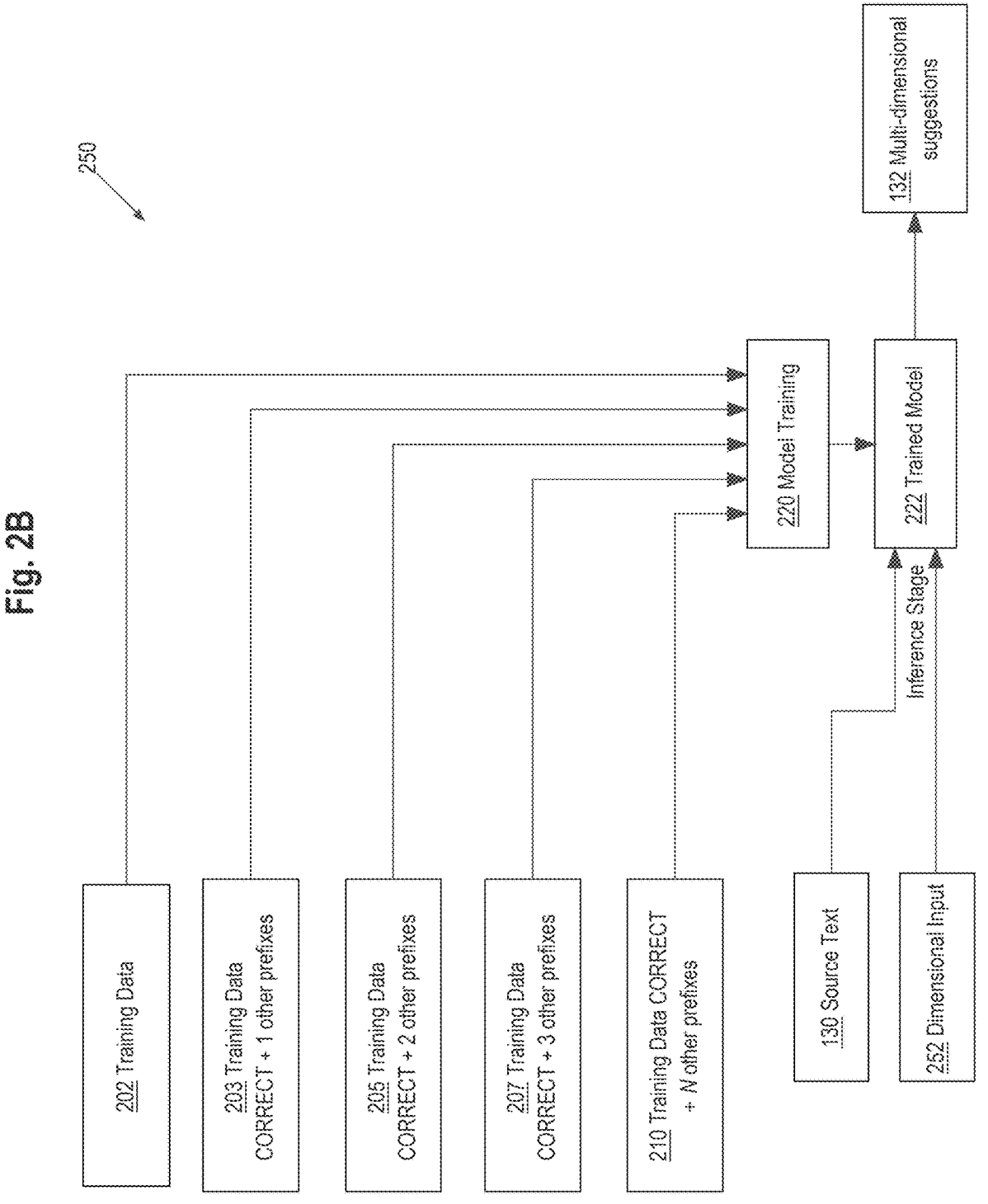
FIG. 2B illustrates an example data flow of singly labeled input and multi-labeled input, using multiple different counts of prefixes, that can be used to produce training data for a trained machine learning model.

FIG. 2B illustrates an example data flow of singly labeled input and multi-labeled input, using multiple different counts of prefixes, that can be used to produce training data for a trained machine learning model. FIG. 2B is a simplified flow diagram of an embodiment of operations that can be performed by at least one device of a computing system. The operations of flow 250 as shown in FIG. 2B can be implemented using processor-executable instructions that are stored in computer memory. For purposes of providing a clear example, the operations of FIG. 2B are described as performed by computer system 100, but other embodiments may use other systems, devices, or implemented techniques. One or more operations in FIG. 2B may be performed by one or more components as described in FIGS. 1A and 1B; for example, the text processor 140 can be programmed, using one or more sequences of instructions, to execute an implementation of FIG. 2B. While the various operations in FIG. 2B are presented and described sequentially, one of ordinary skill in the art will appreciate that some or all the operations may be executed in different orders, may be combined or omitted, and some or all the operations may be executed in parallel. Furthermore, the operations may be performed actively or passively.

In one embodiment, training data 202 comprising singly-labeled or single-prefix training data is provided to model training 220 as a first input. Other inputs to model training 220 comprise training data 203 in which pairs of text elements are labeled using two prefixes, such as <CORRECT> and one other different prefix. Training data of this type will have pairs of text elements in which the first text element has issues with correctness and one other attribute, and the second text element is free of both issues. Similarly, training data 205, 207, 210 each comprise pairs of text elements that are labeled using three, four, or N prefixes, such as <CORRECT> and one or more other prefixes. Training data of this type will have pairs of text elements in which the first text element has issues with correctness and one or more other attributes, and the second text element is free of all issues. In these examples, <CORRECT> is specified as the first prefix merely to show one clear example, and other embodiments could use a different prefix, label, or attribute first, in combination with one or more others, for training data 203, 205, 207, 210. Examples include simplification+correctness; expand+simplification+correctness; paraphrase+expand +simplification+correctness; detoxify+paraphrase+expand+simplification+correctness.

In operation 220, the computer system 100 is programmed to train the unified machine learning model 146 using a parallel corpus for the training data associated with a plurality of intent combinations of intents from training data 202, 203, 205, 207, and 210. For example, the computer system 100 can train a single sequence-to-sequence model to combine multiple dimensional prefixes representing multiple intent combinations in a single pass. The unified machine learning model 146 can be a sequence-to-sequence transformer-based language model which, after training, has about 700 million parameters after training on multiple input/output pairs representing different combinations of linguistic dimensions. In one embodiment, the training data can comprise an equal number of samples corresponding to each of the plurality of intent combinations. Alternatively, the computer system 100 can use a different number of samples for different intent combinations to apply different weights for different attributes in the distribution of the training data.

In operation 222, the computer system 100 can execute the inference stage of the trained unified machine learning model 222 over the source text 130 to determine one or more composable suggestions, based in part on dimensional input 252. In an embodiment, the computer system 100 can use the trained unified machine learning model 146 to determine multi-dimensional suggestions 132 for changing the text to address GEC, clarity, tone, simplification, or other attributes. The multi-dimensional suggestions 132 can be aligned with user intent by receiving the dimensional input 252, which can specify one or more dimension values, and biasing the suggestions based on the magnitude(s) of the one or more dimension values. For example, the dimensional input 252 can identify simplification and correctness. In response, the computer system 100 is programmed to prepend the corresponding prefixes, such as <CORRECT> and <SIMPLIFY>, to the source text 130 before executing the inference stage. In an inference stage, the computer system 100 can evaluate the source text 130 with the unified machine learning model 146 to output multi-dimensional suggestions 132 only for the dimensions that have been specified in the dimensional input 252.

Figure 3A:
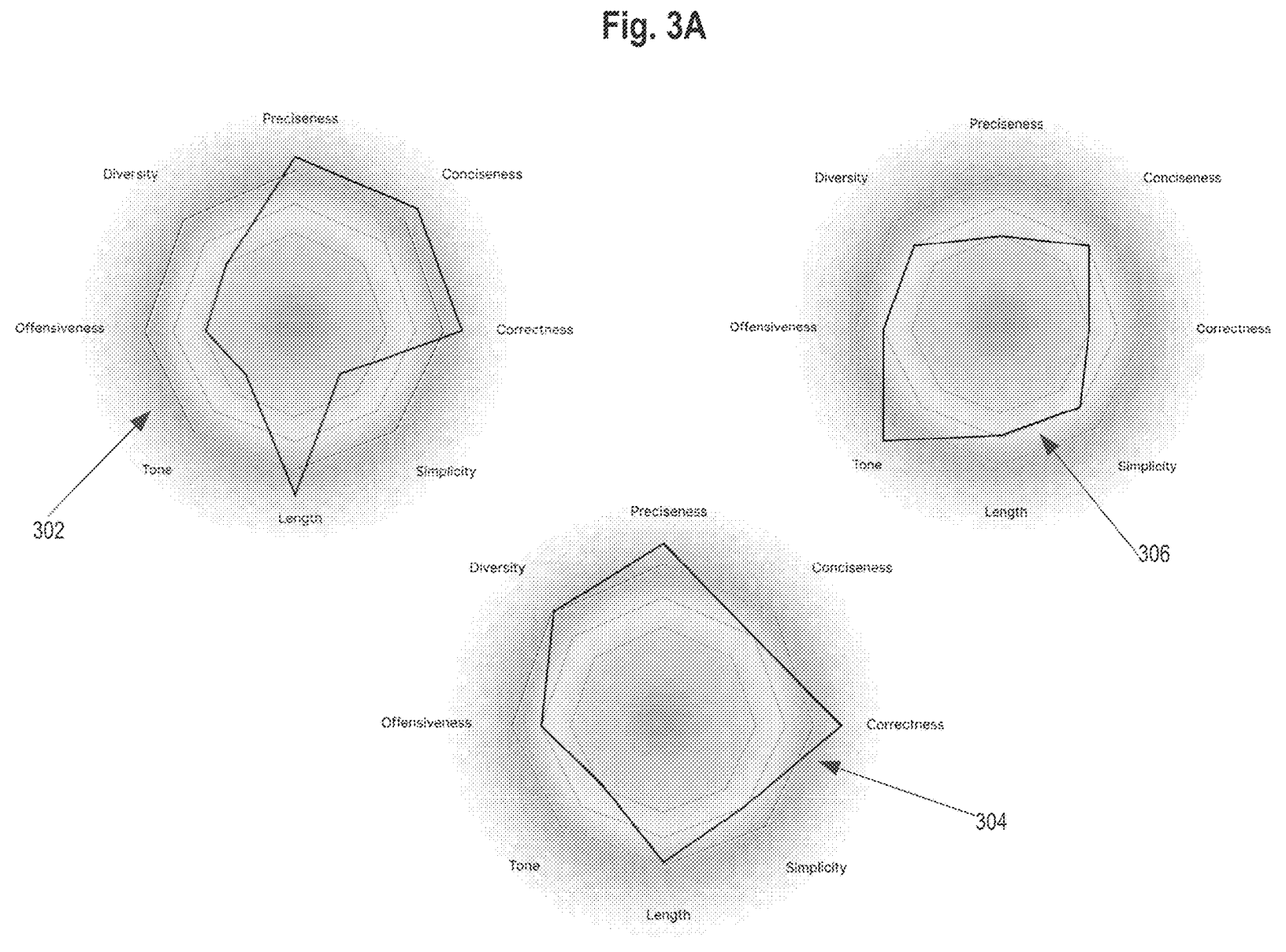

FIG. 3A illustrates a plurality of web diagrams showing different weight values of selections of the attributes of FIG. 1A, FIG. 1B, and FIG. 1C. As with FIG. 1C, each of the web diagrams 302, 304, 306 represents a different possible combination of weight values for prefixes or attributes of natural language text. Each of the web diagrams 302, 304, 306 can represent natural language attributes of different kinds of digital electronic text sources. For example, the web diagram 302 could be assessed using a first text input from a Word document. As another example, the web diagram 304 is assessed using a second text input from an email. As another example, the web diagram 306 is assessed using a second text input from a message. Therefore, the text processor 140 can integrate prefixes as model signals which are triggered differently in different contexts.

Figure 3B:
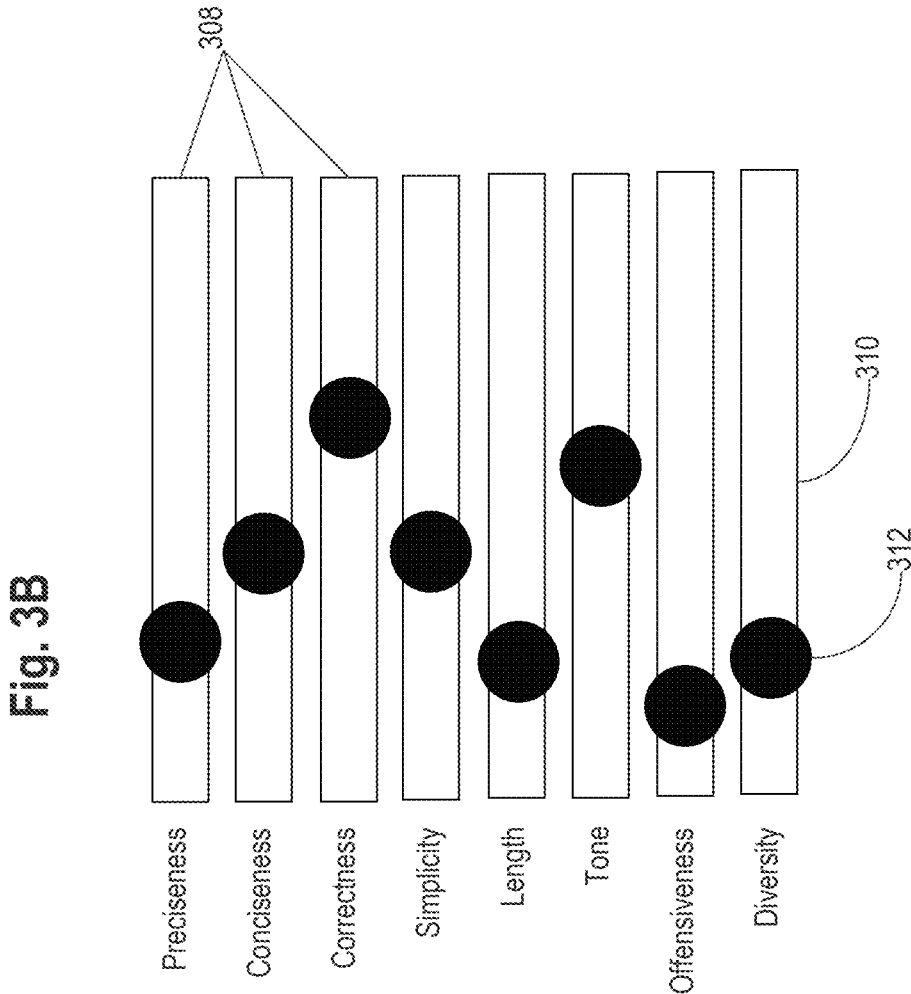
FIG. 3B illustrates an example graphical user interface that could be used to select the different weight values associated with one of the web diagrams of FIG. 3A.

In an embodiment, the magnitude of each weight value or prefix of the web diagrams 302, 304, 306 can be obtained via input from a configuration file, an API call, or direct user input. FIG. 3B illustrates an example graphical user interface that could be used to select the different weight values associated with one of the web diagrams of FIG. 3A. In an embodiment, the graphical user interface comprises a plurality of slider widgets 308, 310, each of the widgets corresponding to a different dimension from among eight linguistic dimensions, such as preciseness, conciseness, correctness, simplicity, length, tone, offensiveness, and diversity. For each dimension, computer input that specifies a position of a visual or graphical slider knob 312 along an elongated slider bar 310 indicates a relative magnitude of a corresponding dimension. By graphically sliding the knob 312 on bar 310 to different positions, input can specify a magnitude from "0" to a maximum value such as "3", "9", "99", or another value. For example, the user can choose a large weight, such as a value of "3" for the correctness attribute so the text processor 140 can weigh more on the correctness dimension. For example, the user can choose a small weight, such as a value of "0" for the length attribute so the text processor 140 can weigh less on the length dimension.

FIG. 3C illustrates an example of suggestions to improve a text input along multiple attributes. The text processor 140 can apply the unified machine learning model 146 to determine sequential suggestion changes along different combinations of attributes, such as combination 322, combination 324, combination 326, and combination 328, to modify the input paragraph 320 based on a user's intent which is to rewrite the input paragraph 320 to correct parallelism, remove semantically unnecessary words, and add hedging. For example, the text processor 140 can apply the unified machine learning model 146 to parse out suggestions with specific annotation guidelines as shown in the prefixes that explain these types of changes to achieve the user's intent. In particular, the suggestions with specific annotation guidelines can be determined using a relatively low-parameter, fine-tuned sequence-to-sequence model. As another example, the text processor 140 can leverage existing data for single outcomes, such as output paragraph 330, to create a small subset of possible combinations, such as combination 322, combination 324, combination 326, and combination 328. For the small subset of possible combinations, the text processor 140 can assess suggestions to determine the best-fitting model that can generalize to all combinations. By controlling for the type of combinations of edits, the text processor 140 can help the user to identify and communicate exactly what it is doing consistently.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
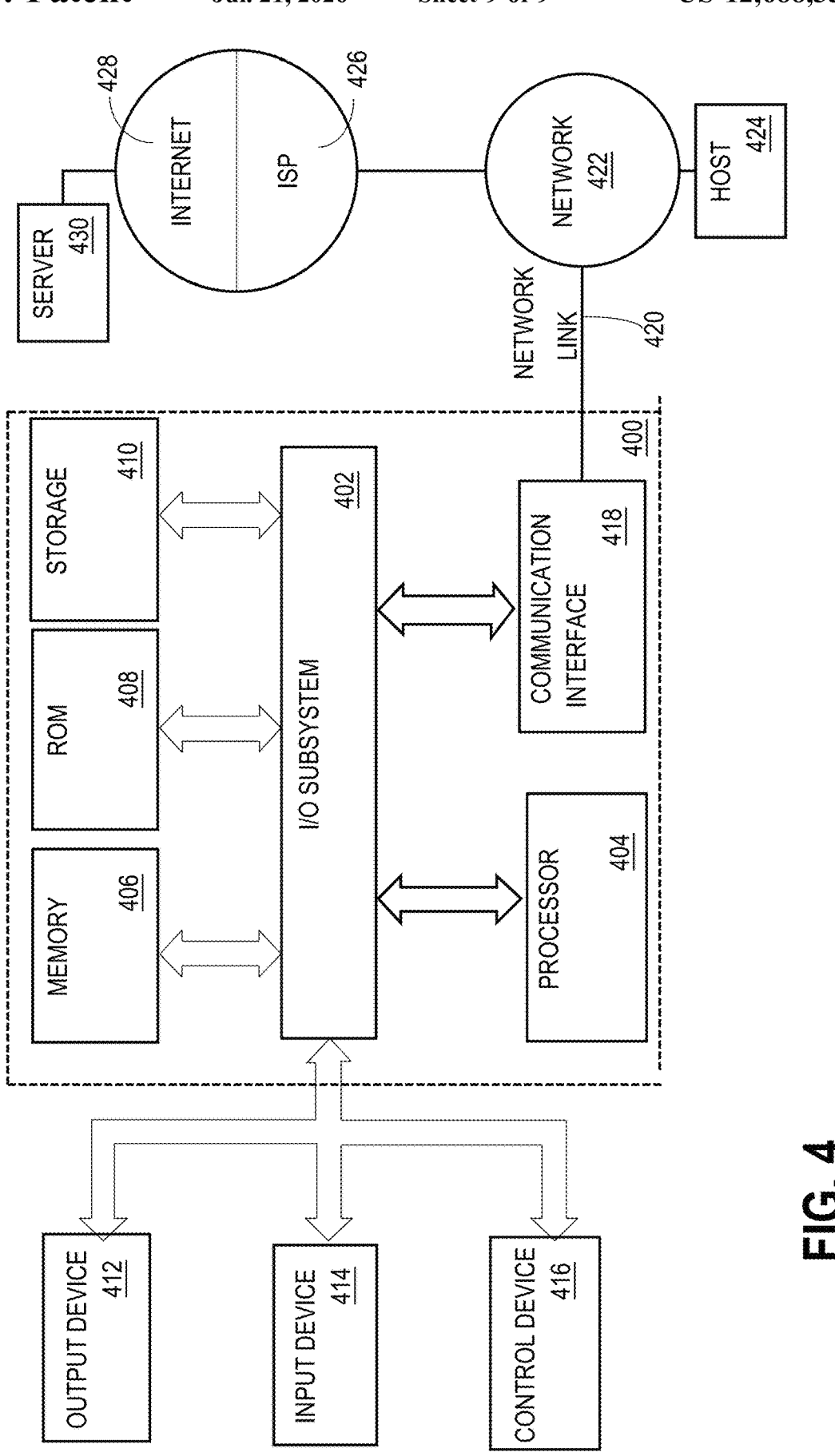
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller, and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU), or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read-only memory (ROM) 408 or other static storage devices coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, solid-state storage, magnetic disk, or optical disks such as CD-ROM or DVD-ROM and may be coupled to I/O subsystem 402 for storing information and instructions. Storage 410 is an example of a non-transitory computer-readable medium that may be used to store instructions and data which when executed by processor 404 cause performing computer-implemented methods to execute the techniques herein.

The instructions in memory 406, ROM 408, or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touchscreen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. The control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infrared data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as placing the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a worldwide packet data communication network represented as Internet 428. A server computer 430 may be coupled to Internet 428. Server 430 broadly represents any computer, data center, virtual machine, or virtual computing instance with or without a hypervisor or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, a server farm, or other organizations of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using a structured query language (SQL) or no SQL, an object store, a graph database, a flat file system, or other data storage.

Computer system 400 can send messages and receive data and instructions, including program code, through the network(s), network link 420, and communication interface 418. In the Internet example, a server 430 might transmit a requested code for an application program through Internet 428, ISP 426, local network 422, and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   receiving, from a client device, a text sequence input that comprises a plurality of words;
   using a server computer, executing an inference stage of a trained unified machine learning model over the text sequence input, the unified machine learning model having been trained on a training dataset comprising a plurality of pairs of records, each of the pairs of records comprising an unmodified natural language text string and a modified natural language text string, each of the unmodified natural language text strings being labeled using one or more prefixes, each prefix among the one or more prefixes corresponding to a different attribute of natural language that is represented in the modified natural language text string, the modified natural language text string comprising one or more modifications corresponding to the one or more prefixes;
   using the unified machine learning model, outputting one or more text suggestions for the text sequence input and explanation data comprising one or more prefixes corresponding to the one or more text suggestions, wherein the one or more text suggestions and the explanation data are outputs of the unified machine learning model; and
   transmitting, to the client device, instructions for presenting a user interface comprising the one or more text suggestions for the text sequence input and the explanation data.

2. The method of claim 1, wherein the unified machine learning model comprises a multi-class neural network.

3. The method of claim 1, wherein the one or more text suggestions for the text sequence input comprise a plurality of unified suggestions to modify the text sequence input in a plurality of different attributes.

4. The method of claim 3, wherein the plurality of different attributes comprises two or more members of the set consisting of: correctness, clarity, length, simplification, diversity, sensitivity, and tone.

5. The method of claim 1, the unified machine learning model having been trained to output the one or more text suggestions for all of:
   a grammatic error correction (GEC) to correct a grammatic error in the text sequence input;
   modifying the text sequence input by merging or splitting one or more words in the text sequence input;
   modifying the text sequence input by expanding or compressing one or more words in the text sequence input;
   modifying the text sequence input by simplifying or complexifying one or more words in the text sequence input;
   modifying the text sequence input by paraphrasing one or more words in the text sequence input;
   modifying the text sequence input by de-toxifying one or more words in the text sequence input; and
   modifying the text sequence input by using formal or informal terms for one or more words in the text sequence input or changing a sentence structure.

6. The method of claim 1, further comprising:
   determining a first suggestion plot for a plurality of attributes before applying the one or more text suggestions for the plurality of words of the text sequence input;
   determining a second suggestion plot for the plurality of attributes after applying the one or more text suggestions for the plurality of words of the text sequence input;
   determining a suggestion improvement by comparing the first suggestion plot to the second suggestion plot; and
   in response to determining the suggestion improvement is above a predetermined threshold, accepting the text suggestions for the plurality of words of the text sequence input.

7. The method of claim 6, further comprising, in response to determining that the suggestion improvement is below the predetermined threshold, rejecting the one or more text suggestions for the plurality of words of the text sequence input.

8. The method of claim 1, further comprising:
before executing the inference stage: receiving first dimension input specifying one or more of the attributes of natural language to check, and receiving second dimension input specifying one or more of the attributes of natural language not to check;
determining two or more input prefixes corresponding to the first dimension input and the second dimension input; and
programmatically transmitting the two or more input prefixes to the trained unified machine learning model to limit the outputting of the one or more text suggestions for the text sequence input and explanation data in relation to the attributes of natural language corresponding to the first dimension input and the second dimension input.

9. The method of claim 8, further comprising receiving the first dimension input and the second dimension input from a user computer associated with an end user or an administrator.

10. The method of claim 8, further comprising determining the first dimension input and the second dimension input by reading configuration data.

11. The method of claim 1, wherein the unified machine learning model has been trained on a corpus of training data in which one or more unmodified natural language text strings in the plurality of pairs of records is labeled concurrently with two or more prefixes among the one or more prefixes.

12. The method of claim 1, wherein the unified machine learning model has been trained on a parallel corpus of training data in which one or more unmodified natural language text strings in the plurality of pairs of records are labeled using each combination of every possible combination of at least three different prefixes among the one or more prefixes.

13. One or more computer-readable non-transitory storage media and storing one or more sequences of instructions which when executed by one or more processors cause the one or more processors to execute:
receiving, from a client device, a text sequence input that comprises a plurality of words;
using a server computer, executing an inference stage of a trained unified machine learning model over the text sequence input, the unified machine learning model having been trained on a training dataset comprising a plurality of pairs of records, each of the pairs of records comprising an unmodified natural language text string and a modified natural language text string, each of the unmodified natural language text strings being labeled using one or more prefixes, each prefix among the one or more prefixes corresponding to a different attribute of natural language that is represented in the modified natural language text string, the modified natural language text string comprising one or more modifications corresponding to the one or more prefixes;
using the unified machine learning model, outputting one or more text suggestions for the text sequence input and explanation data comprising one or more prefixes corresponding to the one or more text suggestions, wherein the one or more text suggestions and the explanation data are outputs of the unified machine learning model; and transmitting, to the client device, instructions for presenting a user interface comprising the one or more text suggestions for the text sequence input and the explanation data.

14. The computer-readable non-transitory storage media of claim 13, wherein the unified machine learning model comprises a multi-class neural network.

15. The computer-readable non-transitory storage media of claim 13, such that the one or more text suggestions for the text sequence input comprise a plurality of unified suggestions to modify the text sequence input in a plurality of different attributes.

16. The computer-readable non-transitory storage media of claim 13, wherein the plurality of attributes comprises two or more members of the set consisting of: correctness, clarity, length, simplification, diversity, sensitivity, and tone.

17. The computer-readable non-transitory storage media of claim 13, the unified machine learning model having been trained to output the one or more text suggestions for all of:
a grammatic error correction (GEC) to correct a grammatic error in the text sequence input;
modifying the text sequence input by merging or splitting one or more words in the text sequence input;
modifying the text sequence input by expanding or compressing one or more words in the text sequence input;
modifying the text sequence input by simplifying or complexifying one or more words in the text sequence input;
modifying the text sequence input by paraphrasing one or more words in the text sequence input;
modifying the text sequence input by de-toxifying one or more words in the text sequence input; and
modifying the text sequence input by using formal or informal terms for one or more words in the text sequence input.

18. The computer-readable non-transitory storage media of claim 13, further comprising sequences of instructions which when executed by the one or more processors cause the one or more processors to execute:
determining a first suggestion plot for a plurality of attributes before applying the one or more text suggestions for the plurality of words of the text sequence input;
determining a second suggestion plot for the plurality of attributes after applying the one or more text suggestions for the plurality of words of the text sequence input;
determining a suggestion improvement by comparing the first suggestion plot to the second suggestion plot; and
in response to determining the suggestion improvement is above a predetermined threshold, accepting the text suggestions for the plurality of words of the text sequence input.

19. The computer-readable non-transitory storage media of claim 18, further comprising sequences of instructions which when executed by the one or more processors cause the one or more processors to execute, in response to determining that the suggestion improvement is below the predetermined threshold, rejecting the text suggestions for the plurality of words of the text sequence input.

20. The computer-readable non-transitory storage media of claim 13, further comprising sequences of instructions which when executed by the one or more processors cause the one or more processors to execute:
before executing the inference stage: receiving first dimension input specifying one or more of the attributes of natural language to check, and receiving second dimension input specifying one or more of the attributes of natural language not to check;

determining two or more input prefixes corresponding to the first dimension input and the second dimension input; and programmatically transmitting the two or more input prefixes to the trained unified machine learning model to limit the outputting of the one or more text suggestions for the text sequence input and explanation data to the attributes of natural language corresponding to the first dimension input and the second dimension input.

21. The computer-readable non-transitory storage media of claim 20, further comprising sequences of instructions which when executed by the one or more processors cause the one or more processors to execute: receiving the first dimension input and the second dimension input from a user computer associated with an end user or an administrator.

22. The computer-readable non-transitory storage media of claim 20, further comprising sequences of instructions which when executed by the one or more processors cause the one or more processors to execute: determining the first dimension input and the second dimension input by reading configuration data.

* * * * *